UNITED STATES PATENT OFFICE.

FRANK J. TONE, OF NIAGARA FALLS, NEW YORK.

REDUCTION OF REFRACTORY COMPOUNDS.

961,913.   Specification of Letters Patent.   Patented June 21, 1910.

No Drawing.   Application filed March 21, 1907. Serial No. 363,539.

*To all whom it may concern:*

Be it known that I, FRANK J. TONE, of Niagara Falls, Niagara county, New York, have invented a new and useful Improvement in the Reduction of Refractory Compounds, of which the following is a full, clear, and exact description.

This invention relates to the reduction of refractory compounds and especially to the metallurgy of aluminum and aluminum compounds and alloys. The direct reduction of ores of aluminum by carbon in the electric furnace has heretofore offered many difficulties. Chief among these has been the fact that on account of the high temperature required, there is a tendency of the aluminum ore or the reduced aluminum, to volatilize at the temperature of reduction and escape from the furnace. The escape from the reaction zone of large volumes of carbon monoxid gas resulting from reduction, also tends to cause large losses of the volatile products, said products being carried out of the furnace along with the gases. I have discovered that much of this difficulty is overcome if the process is divided into two steps. In the first step the aluminum ore is mixed with the proper amount of carbon and reduced to aluminum carbid. In the second step the aluminum carbid is used as a reducing agent in place of carbon for the reduction of ores of various elements to alloys of aluminum and these elements, or for the reduction of aluminum ores to elemental aluminum as the case may be.

For example, in the manufacture of a silicon-aluminum alloy corresponding to the formula 8Al.3Si, I take aluminum carbid and silica in the proportions expressed by the chemical equation:

(1) 

and subject them to heat in an electric furnace, obtaining the silicon aluminum alloy as the final product.

If the element aluminum is to be produced as the final product, a mixture of aluminum carbid and aluminum oxid is made in accordance with the following equation:

(2) 

The advantage of dividing the process into two parts is that the reduction of aluminum ores to aluminum carbid can be accomplished with much greater efficiency than the direct reduction of the ore to the element aluminum. The reason for this is that furnace processes can be adopted for the production of the carbid, which are highly efficient and entail little or no loss by volatilization. Of the 6 parts of aluminum produced in equation (2), 4 parts are the result of the highly efficient first reduction to the carbid, and 2 parts are the result of the less efficient second step of the process. The amount of CO gas evolved per unit of aluminum produced in equation (2) is also much less than in the reaction in which the oxid is directly reduced by carbon.

The process of reduction herein described, may be carried out in any suitable electric furnace capable of generating the requisite temperature, and provided with means for the removal of the reduced products from the reaction zone, and their collection in a receiving space. Such a furnace is shown in my Patent, No. 921,183, dated May 11, 1909.

What I claim is:—

1. The process of reducing ores, which consists in subjecting a mixture of the ore and aluminum carbid to electrically developed heat sufficient to raise the ore above its point of fusion and cause the reduction of the ore by the carbon of the carbid, and the combination of the aluminum with the reduced element of the ore and removing the reduced product from the reaction zone.

2. The process of reducing ores of aluminum, which consists in subjecting a mixture of the ore and aluminum carbid to electrically developed heat sufficient to raise the ore above its point of fusion and cause the reduction of the ore by the carbon of the carbid, and collecting the aluminum resulting jointly from the reduction of the ore and the dissociation of the carbid and removing the reduced product from the reaction zone.

3. The process of reducing ores of aluminum which consists in first reducing an aluminum ore to aluminum carbid and then subjecting a mixture of the carbid and a further quantity of ore to electrically developed heat sufficient to raise the ore above its point of fusion and cause the reduction of the ore by the carbon of the carbid, and collecting the aluminum resulting jointly from the reduction of the ore and the dissociation of the carbid and removing the reduced product from the reaction zone.

4. The process of reducing ores, which consists in subjecting a mixture of the ore and aluminum carbid to electrically developed heat, sufficient to cause the reduction of the ore by the carbon of the carbid and the combination of the aluminum while maintaining the reduction zone at substantially the volatilization temperature by removing the reduced product from the reduction zone.

5. The process of reducing ores of aluminum, which consists in first reducing an aluminum ore to aluminum carbid, and then subjecting a mixture of the carbid and a further quantity of ore to electrically developed heat sufficient to cause the reduction of the ore by the carbon of the carbid, and causing the aluminum resulting jointly from the reduction of the ore and the dissociation of the carbid to be removed from the reaction zone and collected in a receiving space.

In testimony whereof, I have hereunto set my hand.

FRANK J. TONE.

Witnesses:
ASHMEAD G. RODGERS,
CHARLES CHORMANN.